United States Patent [19]

Virtue

[11] Patent Number: 4,727,816
[45] Date of Patent: Mar. 1, 1988

[54] TABLE

[75] Inventor: Julian A. Virtue, Los Angeles, Calif.

[73] Assignee: Virco Mfg. Corporation, Los Angeles, Calif.

[21] Appl. No.: 918,486

[22] Filed: Oct. 14, 1986

[51] Int. Cl.⁴ .............................................. A47B 7/00
[52] U.S. Cl. .................................... 108/91; 108/155; 248/345.1
[58] Field of Search ......................... 108/132, 91, 155; 248/345.1; 403/171, 172, 176

[56] References Cited

U.S. PATENT DOCUMENTS

| | | | |
|---|---|---|---|
| 383,167 | 5/1888 | Brougher | 403/172 X |
| 2,889,185 | 6/1959 | Heisler | 108/91 |
| 3,386,590 | 6/1968 | Gretz | 403/171 |
| 3,446,345 | 5/1969 | Frosoy | 248/345.1 |
| 3,590,753 | 7/1971 | Blink | 108/91 |
| 3,604,372 | 9/1971 | Hewett | 108/91 |
| 4,538,526 | 9/1985 | Seeley | 108/132 |

Primary Examiner—Francis K. Zugel
Attorney, Agent, or Firm—James E. Brunton

[57] ABSTRACT

A folding table construction embodying a planar top, foldable legs and a novel apron assembly connected to the underside of the top. The apron unit comprises elongated discrete, relatively short straight lengths of formed metal side and end strips, or stringers, which are securely interconnected together by spaced apart, one-piece, blow molded corner moldings adapted to be affixed to the underside of the table top. Due to the novel design of the corner moldings and the stringers, the construction of the supporting apron requires no metal bending or welding. Further, the corner moldings can be colored during the molding step and the stringers can be painted to match in small painting units prior to apron assembly.

7 Claims, 9 Drawing Figures

U.S. Patent   Mar. 1, 1988   Sheet 1 of 3   4,727,816
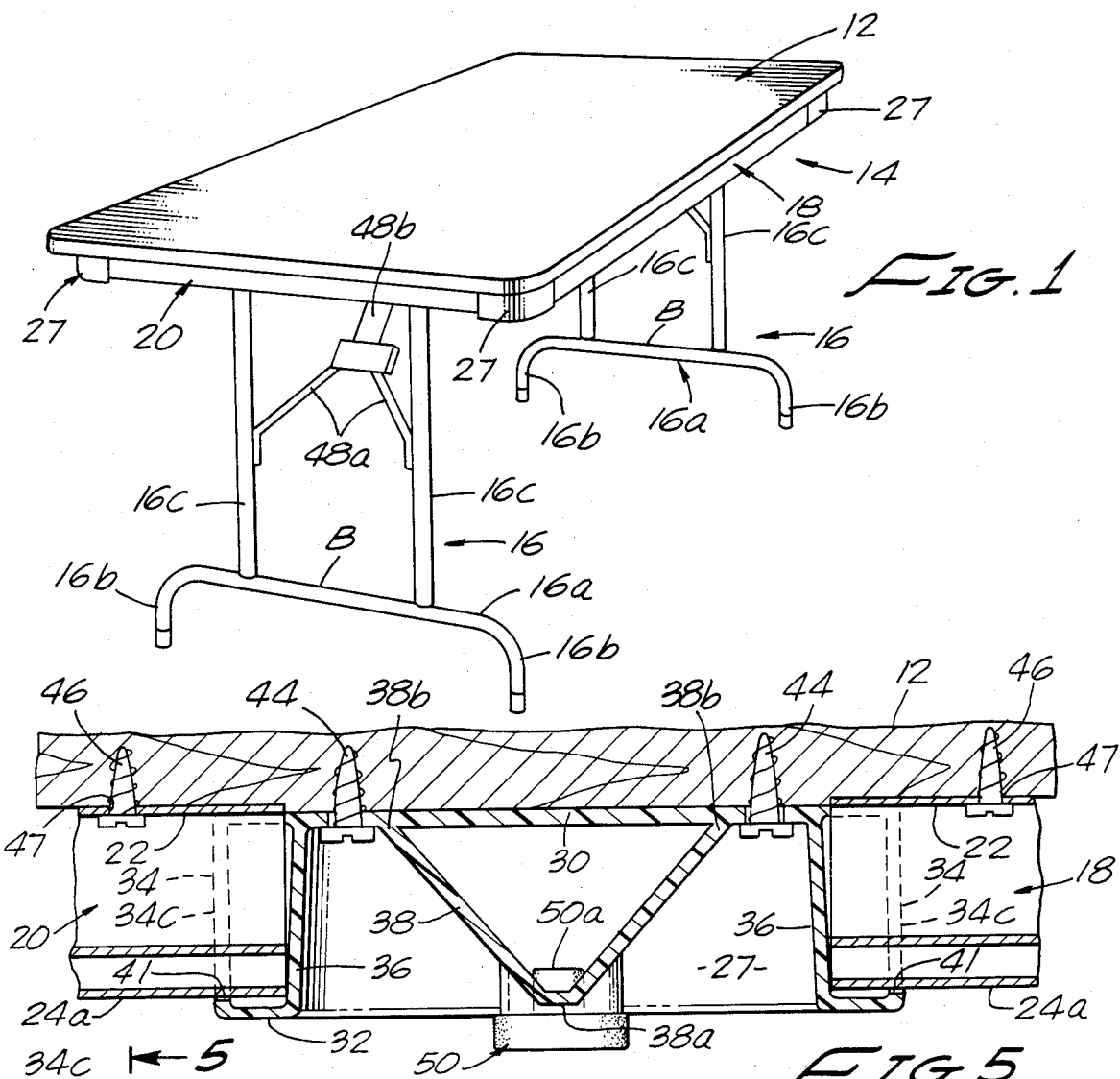
FIG. 1
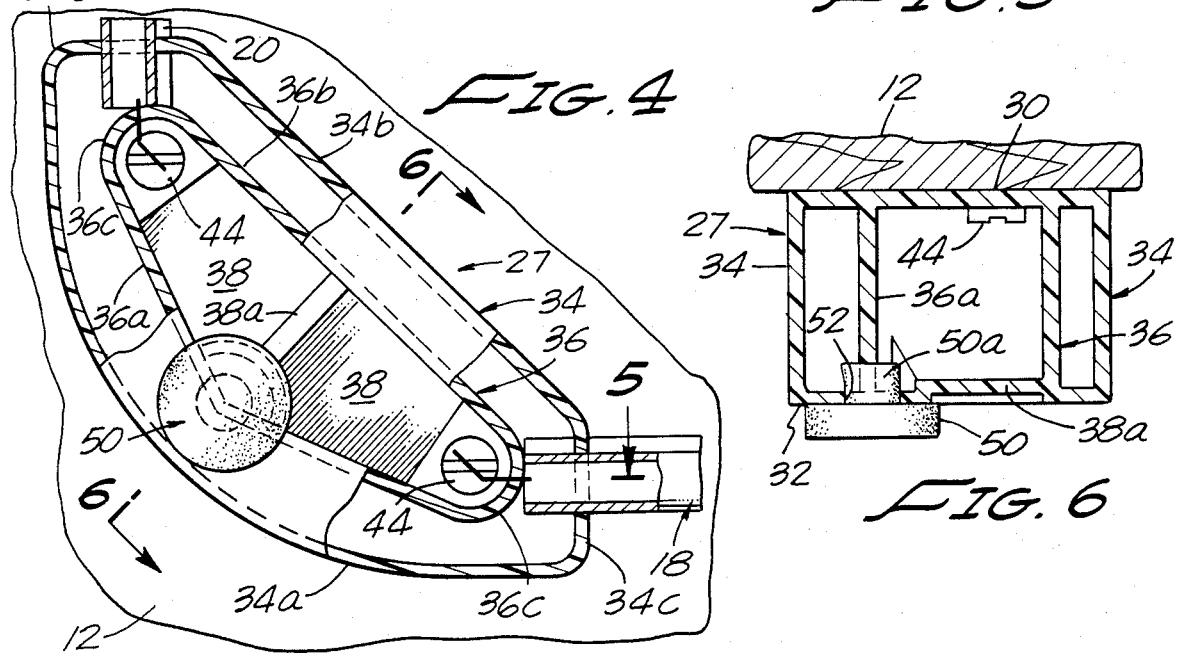
FIG. 5
FIG. 4
FIG. 6

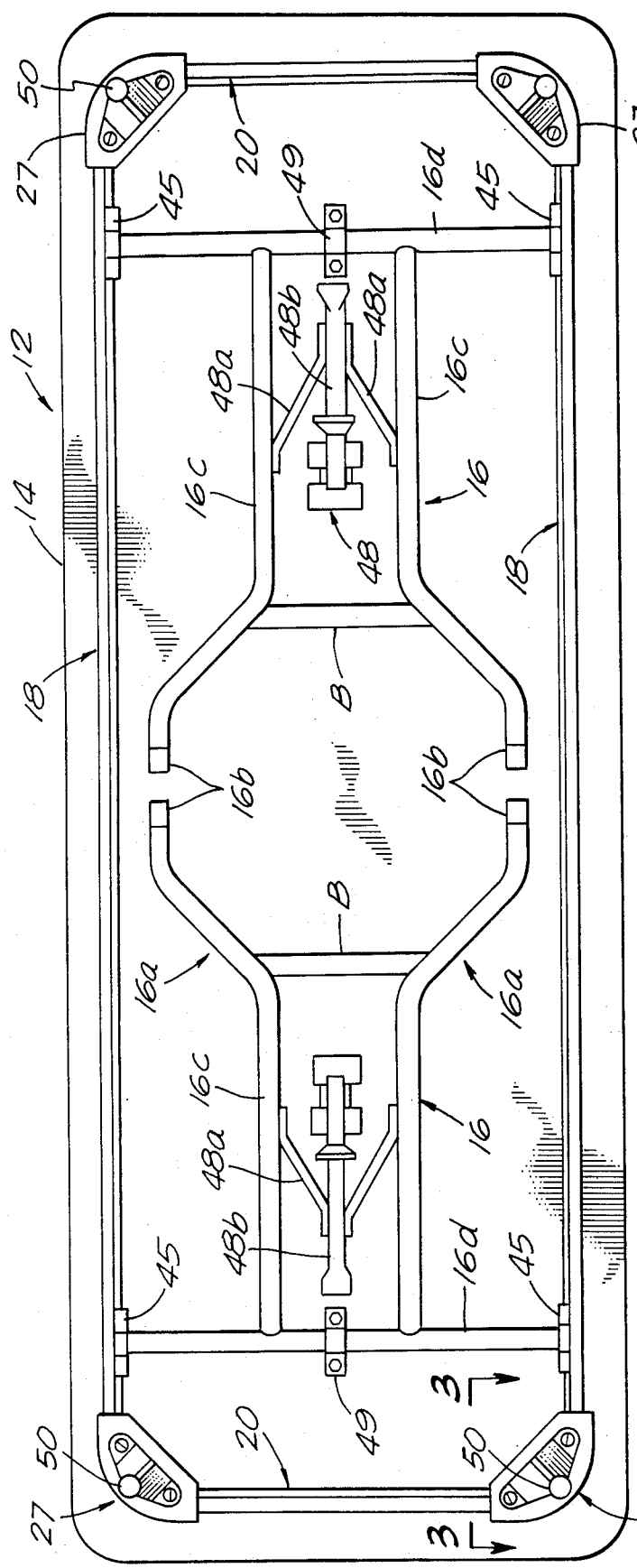
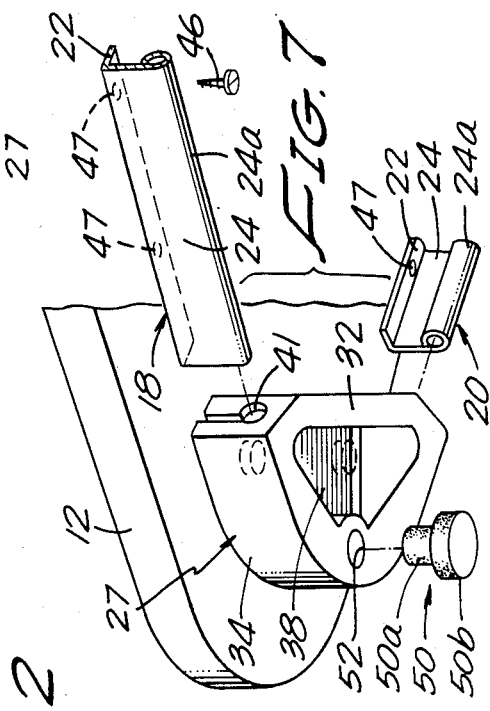
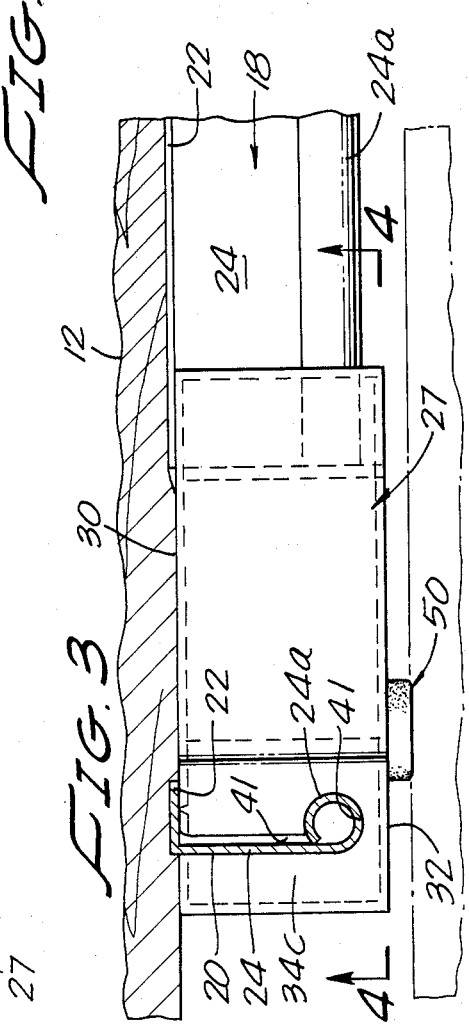

TABLE

BACKGROUND OF THE INVENTION

1. Field of the Invention

The present invention relates generally to table construction. More particularly the invention concerns a folding table construction embodying a planar top, foldable legs and a novel apron assembly connected to the underside of the top comprising spaced apart molded corner moldings which are uniquely slotted to closely receive and securely support the end portions of specially configured elongated side and end structural members of the apron.

2. Discussion of the Prior Art

Folding tables of numerous designs and for various uses exist in the prior art. Common features of most such tables include a generally rectangularly shaped planar top, a generally rectangularly shaped supporting apron upon which the top rests and spaced apart downwardly extending legs which support the top in an elevated generally horizontal position.

As a general rule, the supporting aprons of prior art tables are constructed from a single, long length of relatively heavy gauge L-shaped sheet metal which is bent to form a generally rectangular shaped, planar configuration. After bending the L-shaped metal strip, the adjacent free ends thereof are joined, as by welding, and the apron thus formed is painted and then connected to the bottom surface of the table top. This bending, welding and painting operation is inordinately time consuming and expensive. Further, because the apron must be painted after the welding step, relatively large and expensive paint spray booths are required for the painting operation. Additionally, aprons made by this conventional process tend to warp out of plane during welding and handling and are extremely cumbersome to handle, ship and store.

The table construction of the present invention overcomes the drawbacks of the prior art as set forth in the preceding paragraphs by utilizing a novel apron assembly, the construction of which requires no bending of metal and no welding. Further, painting of the apron of the invention is greatly simplified because the elongated stringer members which make up the apron assembly comprise discrete, relatively short straight lengths of formed metal strips which can expeditiously be painted in small painting enclosures prior to the final assembly of the apron. Additionally, because the metal stringers which make up the apron assembly are straight and light weight, they are very easy to handle, transport and store.

Further simplifying the table construction of the present invention is the fact that the metal stringers which form the sides and ends of the apron are uniquely interconnected together by means of novel one-piece, precolored, molded corner pieces which are specially slotted to closely receive and securely support the end portions of the stringers which form the apron sides and ends. The corner moldings are attractive, extremely strong and durable. They require no painting and can be very inexpensively made in large quantities.

The unique apron unit of the present invention can be readily assembled by unskilled workers to repeatedly and reliably form a perfectly square, planar structure. The apron, which is connected to the underside of the table top by suitable connectors, also uniquely functions to hingably carry and support the leg assemblies of the table for movement between a first downwardly extending position to a second folded position wherein the leg assemblies are disposed in close proximity with the underside of the table top.

SUMMARY OF THE INVENTION

It is an object of the present invention to provide a novel folding table construction which embodies a top supporting apron assembly which is inexpensive to manufacture and is easy to handle, ship and store. More particularly it is an object of the invention to provide a uniquely configured supporting apron unit which comprises elongated discrete, relatively short straight lengths of formed metal side and end strips, or stringers, which are securely interconnected together by spaced apart, one-piece, molded corner pieces adapted to be affixed to the underside of the table top.

Another object of the invention is to provide a table construction of the aforementioned character in which the construction of the supporting apron requires no metal bending or welding.

Still another object of the present invention is to provide a table construction as described in the preceding paragraphs in which the corner moldings which interconnect and support the side and end stringers are one colored and require no painting.

Another object of the invention is to provide a novel table construction in which the side and end stringers of the supporting apron unit can be conveniently painted as discrete elements prior to the final assembly of the apron assembly.

Another object of the invention is to provide a unique top supporting apron assembly which embodies corner moldings which are attractive, which are interiorly reinforced so as to be extremely strong and durable in use and which can be very inexpensively manufactured in quantity.

Yet another object of the invention is to provide a novel supporting apron assembly of the character described in the preceding paragraph in which the metal stringers forming the sides and ends of the apron terminate in a uniquely configured lower edge which is rounded so as to prevent injury to persons lifting the tables by gripping the underside of the apron. To accommodate the rounded lower edge portions of the stringers, the corner moldings are provided with novel key shaped slots which closely receive and support the end portions of the stringers.

Still another object of the invention is to provide a table construction of the class described in which each assembled apron unit is perfectly planar and is provided with uniquely configured bumper members carried by each corner molding to permit one table to be stacked upon another without causing damage to either table.

Yet another object of the invention is to provide a table construction embodying an apron assembly of the character described in the preceding paragraphs which is of sufficient strength to hingably support the foldable leg members of the table to permit smooth pivotal movement thereof between an extended position and a storage position.

These and other objects of the invention are realized by a novel table construction which includes a generally planar top, an apron assembly connected to the underside of the top and folding legs pivotally connected to the apron assembly. The apron unit of the invention comprises at least three elongated generally L-shaped members, or stringers, and at least three spaced apart, molded corner members each having a top wall, a spaced apart bottom wall, external side walls interconnecting the top and bottom walls. The external walls of each corner member is provided with at least two vertically extending slots adapted to closely receive and support the end portions of the elongated stringers.

BRIEF DESCRIPTION OF THE DRAWINGS

FIG. 1 is a generally perspective view of one form of the folding table of the invention.

FIG. 2 is an enlarged bottom view of the table in a folded configuration.

FIG. 3 is an enlarged fragmentary view taken along lines 3—3 of FIG. 2.

FIG. 4 is a fragmentary cross-sectional view taken along lines 4—4 of FIG. 3.

FIG. 5 is a fragmentary cross-sectional view taken along lines 5—5 of FIG. 4.

FIG. 6 is a fragmentary cross-sectional view taken along lines 6—6 of FIG. 4.

FIG. 7 is a fragmentary, generally perspective view illustrating the general configuration of the corner elements of one form of the present invention and the manner of assembly of the side and end stringers therewith.

DESCRIPTION OF ONE FORM OF THE INVENTION

Figure 8:
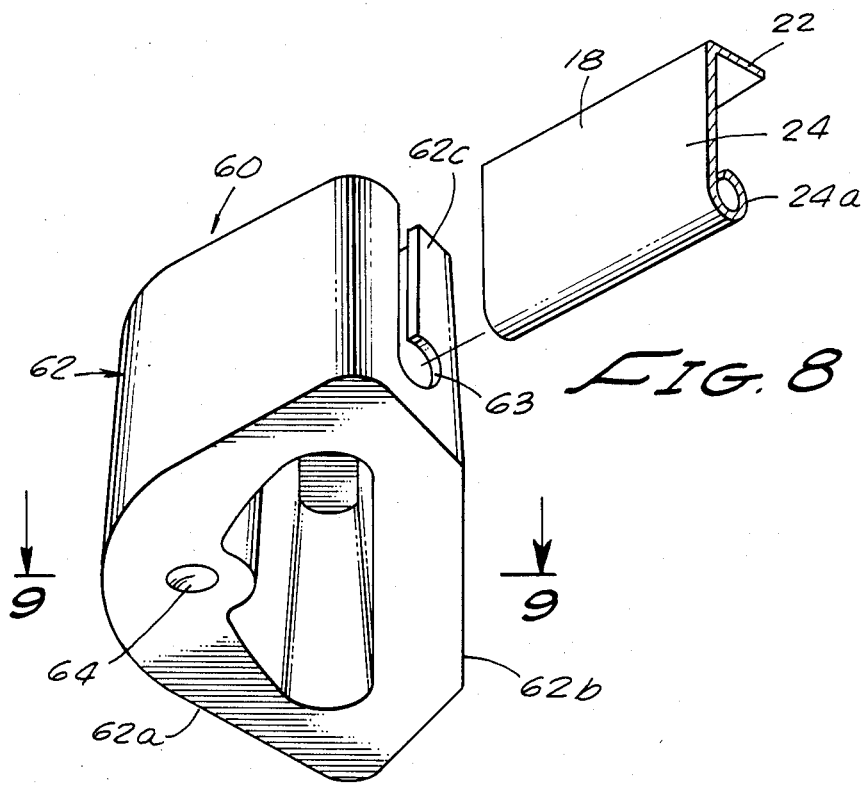
FIG. 8 is a generally perspective exploded view of an alternate form of corner molding.

Referring to the drawings and particularly to FIGS. 1 and 2, the table construction of one form of the present invention comprises a generally planar top 12, an apron assembly 14 connected to the underside of the top and two pairs of longitudinally spaced leg assemblies 16 which are hingably interconnected with apron assembly 14.

Turning also to FIGS. 4 and 5, the apron assembly 14 of this form of the invention comprises four elongated stringers, or angle members, which are substantially L-shaped in cross-section. Two of the four stringers are side stringers 18 and two of the stringers are end stringers 20 (FIG. 2). As best seen by turning to FIG. 7, each of the stringers has a base portion 22 and a generally perpendicularly downwardly extending wall portion 24 connected to the base portion. The wall portions 24 of each stringer terminate in a curved lower edge portion 24a, which, as indicated in FIG. 3, is generally circular in cross-section at any point.

Also forming an important part of the apron assembly of the invention are four one-piece, injection molded corner members, or moldings, 27 (FIG. 2). These corner moldings 27 are affixed by suitable connectors to the underside of the table top 12 at spaced apart locations proximate the corners of the table top. The corner moldings 27, which are of a unique configuration presently to be described, function to rigidly support the end portions of the stringers 18 and 20.

Turning now to FIGS. 4 through 7, the corner members 27 each have a top wall 30, a vertically spaced bottom wall 32 and external side walls 34 interconnected with one another and functioning to interconnect the top and bottom walls. As best seen in FIG. 4, the external walls include a curved outer portion 34a, a generally straight inner portion 34b and transversely spaced angularly extending portions 34c which serve to interconnect portions 34a and 34b. Disposed in an internally spaced relationship with respect to external side walls 34 are reinforcing means here comprising internal walls 36. Internal walls 36 comprise a portion 36a internally spaced from external wall 34a, a generally straight section 36b spaced internally from external wall 34b and arcuate end portions 36c interconnecting wall portions 36a and 36b. For a purpose presently to be described, end portions 36c are spaced inwardly from wall portions 34c of the external walls by a predetermined limited distance.

To further structurally reinforce the corner mold members 27, a pair of angularly downwardly extending walls 38 are provided internally of the spaced defined by internal walls 36. Walls 38, which also comprise the reinforcing means of this form of the invention, are integrally formed at their edges with internal walls 36 and join together at an apex, or ridge, 38a. The upper extremities 38b of walls 38 interconnect with top wall 30 in the manner shown in FIG. 5.

Each of the corner mold members 27 has the structurally reinforced configuration described in the preceding paragraph and each is formed in a single piece by an injection molding process of a character well understood by those skilled in the molding art. While other materials may be used, polyethylene and polypropylene have proven to be satisfactory as construction materials for forming the corner members 27. This material can be colored to produce an end part of almost any desired color which will correspond closely to the color of the paint used to paint the stringers 18 and 20.

Referring once again to FIGS. 3 and 7, portions 34c of the external walls 34 of each corner member 27 is provided with a generally keyhole shaped slot 41 which is adapted to closely receive the end portions of the stringers 18 and 20 which make up the apron assembly 14.

As best seen in FIG. 4, when the stringers 18 and 20 are assembled with the corner mold members 27, the end portions of these stringers are inserted within apertures 41 until the extremities of the stringers move into engagement with end wall portions 36c of internal walls 36. This precise positioning of the stringers within the corner members 27 insures that a rigid structural assembly will result, which assembly is of precisely predetermined dimensions, is substantially perfectly rectangular in shape and is substantially flat, or planar.

As indicated in FIG. 5, each of the corner members 27 is rigidly affixed to the underside of the table top 12 by means of threaded fasteners 44. Similarly, after the stringers 18 and 20 have been inserted into the corner members in the manner shown in FIG. 4, the stringer members 18 and 20 are affixed to the underside of the table top by means of threaded fasteners 46 which extend through longitudinally spaced apart drilled holes 47 provided in base walls 22 of the stringers members.

Turning once again to FIGS. 1 and 2, the spaced apart leg assemblies 16 of this form of the invention comprise a generally U-shaped portion 16a having downwardly depending, floor engaging legs 16b. Interconnected with the bight portion "B" of the U-shaped member 16a are transversely spaced, upwardly extending columns, or legs, 16c. As best seen in FIG. 2, the ends of legs 16c opposite to those connected to the bight portions "B" are interconnected to transversely extending axle members 16d which, in turn, are hingably carried by stringer members 18. With this construction, leg assemblies 16 are movable between a first downwardly extending position, as illustrated in FIG. 1, to a second folded position, as illustrated in FIG. 2, wherein the leg assemblies are in close proximity with the lower surface of the top 12 and extend generally parallel to the plane thereof. To facilitate smooth rotational movement of the axle member 16d, bearing means or assemblies 45 are carried by stringer members 18 at longitudinally spaced apart locations. To provide further support to the axle members 16, centrally disposed bearing means or assemblies 49 are affixed to the underside of the tabletop 12.

A locking assembly, generally designated by the numeral 48, is provided in operable association with each pair of leg assemblies 16 to releasably lock the leg assemblies in the downwardly extending position shown in FIG. 1. These locking assemblies 48 are of a type well known to those skilled in the art and form no part of the present invention. The assemblies comprise a pair of side members 48a which are interconnected at one end with legs 16c and are interconnected at the other end with a central slide mechanism 48b which is suitable mounted to the underside of the tabletop 12.

Interconnection of axle members 16d with the stringers 18 via the bearing assemblies 45 results in a highly rigid and stable structural configuration superior to prior art table constructions wherein the legs pivot about hinge mechanisms affixed only to the underside of the top of the table.

When the leg assemblies are in the folded configuration shown in FIG. 2, it is quite common to store several of the folded tables in one location by stacking one table on top of another. When this was done with prior art configurations, the top of one table was very often scarred, scratched, or otherwise damaged by the apron of the second table sliding on the tabletop. To remedy this prior art deficiency, the apron assembly of the present invention includes uniquely configured bumper means carried by the corner members 27 for engagement with the planar surface of the table upon which the apron rests. These bumper means are designed to prevent scarring of the adjacent tabletop and to prevent the table construction from accidentally sliding with respect to the tabletop of the adjacent table. In the present form of the invention, these bumper means are provided in the form of one-piece members formed of a resilient material such as rubber, teflon, soft plastic or the like. Each of the bumper members, which are generally designated in the drawings by the numeral 50, have a first generally cylindrical portion 50a and a second enlarged diameter cylindrical portion 50b (FIG. 7). With this construction, each of the corner mold member 27 is provided with a central aperture 52 adapted to closely receive the first cylindrical portion 50a of the bumper 50. As indicated in FIG. 6, when the bumper 50 is in place within the corner member, the enlarged diameter portion thereof 50b extends outwardly from the bottom wall 32 of the corner member so as to prevent the metal stringers 18 and 20 from coming into direct contact with the planar surface upon which the folded table may be placed. Because of the material selected for the fabrication of the bumpers 50, once the folded table is in position on a planar surface, the bumpers will resist any undesired sliding of the table assembly relative to the planar surface.

Figure 9:
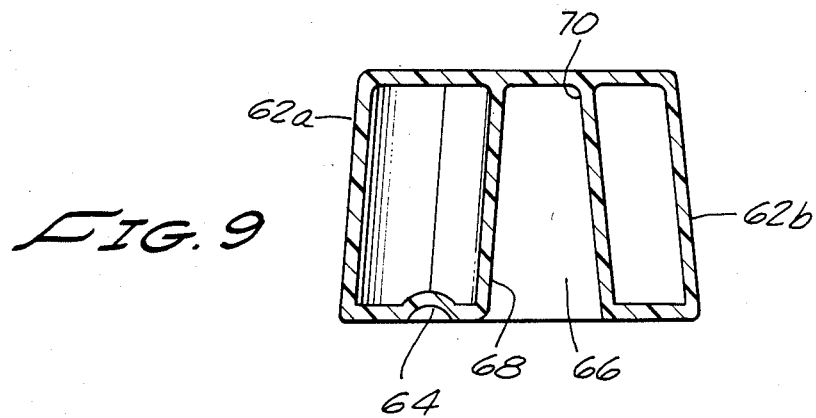
FIG. 9 is a cross-sectional view taken along lines 9—9 of FIG. 8.

Turning now to FIGS. 8 and 9, an alternate and somewhat simplified form of corner piece or molding is thereshown. These corner pieces, generally designated by the numeral 60, like molds 27, are affixed by suitable connectors to the underside of the table top 12 at spaced apart locations proximate the corners of the table top. The corner moldings 60 each have a top wall 62, a vertically spaced bottom wall and external side walls 62a and 62b which function to interconnect the top and bottom walls. As best seen in FIG. 9, the bottom wall is provided with a bumper receiving cavity 64 and the external walls converge inwardly in the manner shown in the drawing. Disposed in an internally spaced relationship with respect to external side walls 62a and 62b are reinforcing means here comprising internal walls 68. Internal walls 68 also converge inwardly and function to interconnect the top and bottom walls. A bottom open cavity or opening 66 is defined by walls 68.

Referring once again to FIG. 8, the external walls 62a and 62b of each corner member join to form an end wall 62c which is provided with a generally keyhold shaped slot 63. Slots 63 are adapted to closely receive the end portions of the stringers 18 and 20 which make up the apron assembly 14.

As indicated in FIG. 8, when the stringers are assembled with the corner mold members 60, the end portions of these stringers are inserted within apertures 63 until the extremities of the stringers move into engagement with the internal walls 68. This precise positioning of the stringers within the corner members insures that a rigid structural assembly will result, which assembly is precisely rectangular.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A table construction, comprising:
   (a) a generally planar top;
   (b) an apron assembly connected to said top, comprising:
      (i) at least three elongated angle members each having a base and a generally perpendicularly extending wall connected to said base, said wall having end portions terminating in a curved lower edge portion; and
      (ii) at least three one-piece, injection molded corner members attached to said planar top, each having a top wall, a spaced apart bottom wall, external side walls interconnecting said top and bottom walls, said external walls being provided with at least two vertically extending slots adapted to closely receive said end portions of said walls of said elongated angle members, internal side walls spaced from said external walls, and reinforcing means connected to said internal walls for structurally reinforcing said internal walls; and
   (c) leg assemblies interconnected with said apron assembly for supporting said top in an elevated, generally horizontal plane, said lower edge portion of said wall of said angle members being generally circular in cross-section and the vertically extending slots formed in said external walls being formed to closely receive said angle members.

2. A table construction as defined in claim 1 in which said reinforcing means comprises internal side walls spaced apart from said external side walls and a pair of angularly extending walls integrally formed with said internal side walls.

3. A table construction as defined in claim 1 in which said reinforcing means comprises a plurality of wall members disposed intermediate said internal and external walls.

4. A table construction as defined in claim 3 including bumper means carried by said corner members for non-marring, non-sliding engagement with a planar surface upon which said apron may be placed when said legs are in folded position.

5. A table construction as defined in claim 4 in which said top wall of each of said corner members is apertured and in which said bumper means comprises a one-piece member formed of a resilient material, said member having a first cylindrical portion receivable in said apertured top wall and a second enlarged diameter cylindrical portion extending above said top wall.

6. A table construction, comprising:
 (a) a generally planar top; and
 (b) an apron assembly connected to said top, comprising:
  (i) four elongated angle members each having a base and a generally perpendicularly extending wall connected to said base, said wall having end portions terminating in a curved lower edge portion; said edge portion being generally circular in cross-section; and
  (ii) four one-piece, injection molded corner members attached to said planar top, each having a top wall, a spaced apart bottom wall, external side walls interconnecting said top and bottom walls, said external walls being provided with at least two vertically extending key-hole shaped slots adapted to closely receive said end portions of said walls of said elongated angle members, internal side walls spaced from said external walls, and reinforcing means connected to said internal walls for structurally reinforcing said internal walls said reinforcing means comprising a plurality of wall members disposed intermediate said external side walls and said internal side walls.

7. A table construction as defined in claim 6 further including two pairs of longitudinally spaced leg assemblies hingably interconnected with said apron assembly for supporting said top in an elevated, generally horizontal plane, said leg assemblies being movable between a first downwardly extending position to a second folded position wherein said leg assemblies are in close proximity with said top and extend generally parallel to the plane thereof.

* * * * *